United States Patent

[11] 3,604,565

| [72] | Inventor | Richard T. Freeman<br>London, England |
|---|---|---|
| [21] | Appl. No. | 775,478 |
| [22] | Filed | Nov. 13, 1968 |
| [45] | Patented | Sept. 14, 1971 |
| [73] | Assignee | Molins Machine Company Limited<br>London, England |
| [32] | Priority | Nov. 15, 1967 |
| [33] | | Great Britain |
| [31] | | 51,886/67 |

[54] TOOL-HOLDING DEVICES
1 Claim, 10 Drawing Figs.

[52] U.S. Cl. .................................................. 211/60,
211/69, 248/314, 279/1 R, 287/126
[51] Int. Cl. ........................................................ B23q 3/155
[50] Field of Search............................................ 211/60 T,
60, 62, 69, 69.5, 69.8; 248/314; 206/17, 17.5;
29/568; 269/16; 285/345; 287/126; 279/1 R

[56] References Cited
UNITED STATES PATENTS

| 2,666,967 | 1/1954 | Poitras ......................... | 211/60 UX |
|---|---|---|---|
| 2,285,956 | 6/1942 | Weber........................... | 279/1 R UX |
| 2,484,027 | 10/1949 | Haffey........................... | 279/1 R UX |
| 3,179,255 | 4/1965 | De Caccia..................... | 248/314 X |
| 3,191,260 | 6/1965 | Jorgensen..................... | 29/568 UX |
| 3,267,254 | 8/1966 | Weller........................... | 211/60 X |
| 3,286,344 | 11/1966 | Brainard........................ | 211/1.5 UX |

FOREIGN PATENTS

| 468,269 | 12/1951 | Italy .............................. | 211/60 T |
|---|---|---|---|

Primary Examiner—Roy D. Frazier
Assistant Examiner—Abraham Frankel
Attorneys—Emory L. Groff and Emory L. Groff, Jr.

ABSTRACT: A form of toolholder for holding a cutting tool in a tool magazine. The toolholder is internally and externally cylindrical and contains gripping means to grip a holdable portion of the tool. There is also disclosed a tool magazine having a plurality of stepped cylindrical holes of the same size each to receive a toolholder. The internal diameter of each toolholder being appropriate for the diameter of the holdable portion of the cutting tool carried therein.

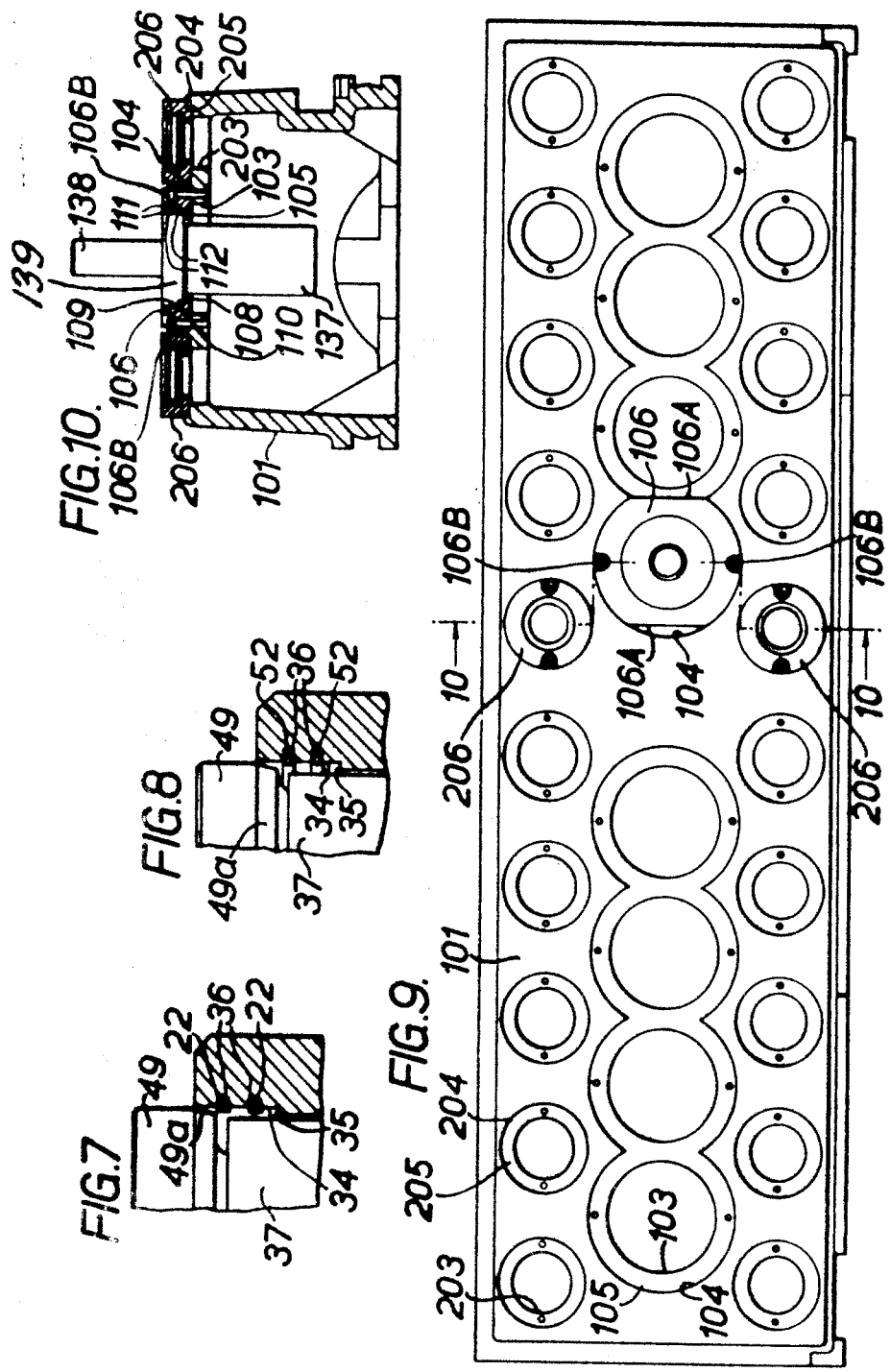

TOOL-HOLDING DEVICES

This invention concerns improvements in or relating to tool-holding devices.

In U.S. Pat. Nos., Re 25,956 and 3,241,451 there is disclosed an arrangement for changing the cutting tool in the spindle of a numerically controlled machine tool wherein the spindle is aligned with a selected position in a tool magazine and withdraws a tool therefrom, and, after such tool has been used for machining, is realigned with said selected position to replace the tool in the magazine, and is then aligned with a further selected position in the magazine to receive a further tool. The machine tool spindle grips each tool by its shank, i.e. the end opposed to its cutting end, and each tool is received and held in the magazine by its cutting end so that the shank end projects from the magazine and can be received by the spindle. With such an arrangement it is necessary that the tools are held in the tool magazine sufficiently firmly to prevent their falling therefrom, but so that they can be removed from and replaced in the tool magazine by the spindle. It is further necessary that the tools are held in the magazine so that their projecting shanks are positioned with sufficient accuracy to enable the spindle to receive the tools under data control. The tool magazine must therefore be provided with toolholders which meet these requirements.

According to the present invention there is provided a toolholder for holding a cutting tool having a holdable portion of greater diameter than its cutting portion, or a cutting tool carried in a carrier having a holdable portion of greater diameter than the cutting portion of the tool, the tool being carried so that the cutting portion of the tool projects from the carrier, said toolholder having a substantially cylindrical hole of diameter greater than that of said holdable portion, and gripping means associated with said hole to grip said holdable portion to hold the tool in the toolholder. The gripping means may comprise a ring of resilient material housed in an annular recess in the cylindrical wall of the hole so as to project from the wall and grip the said holdable portion. There may be at least two spaced annular recesses in the cylindrical wall of the hole each recess housing a ring of resilient material.

The substantially cylindrical hole may have an abutment to limit insertion of the tool into the toolholder. Thus, the hole may be stepped to comprise a lower cylindrical portion of diameter less than that of said holdable portion but greater than that of said cutting portion, and an upper cylindrical portion of diameter slightly greater than that of said holdable portion whereby the abutment is formed by the shoulder between the lower and upper portions of the holes.

Further according to the present invention there is provided a tool magazine having a plurality of stepped holes of the same size and a toolholder as set forth in each of a plurality of said holes, the substantially cylindrical holes in the toolholders being of different diameters whereby a plurality of cutting tools with cutting portions of different diameters may be held in the tool magazine.

The invention further provides for use with such a toolholder a cutting tool having a carrier in the form of a detachable disc of diameter greater than the cutting portion of the tool to provide said holdable portion, the disc having a central hole fitting over the shank of the tool.

Tool-holding devices in accordance with the invention will now be described, by way of example, with reference to the accompanying drawing, in which:

FIG. 7 is a detail modification of part of FIG. 4 to a larger scale, FIG. 8 is a view corresponding to FIG. 7 of a further detail modification of part of FIG. 4, FIG. 9 is a plan view of a second form of tool magazine, and FIG. 10 is a section on the line 10—10 of FIG. 9.

Figure 1:
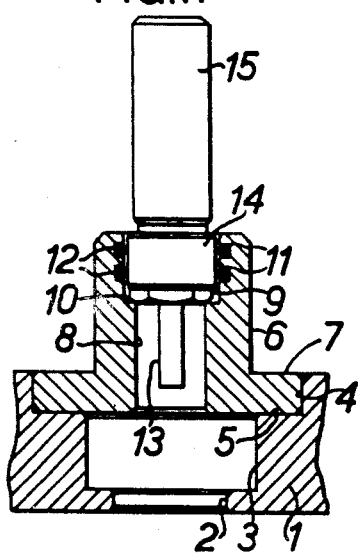
FIGS. 1 to 4 are sections through tool-holding devices.

FIG. 1 shows part of a tool magazine 1 having a stepped hole therein comprising a lower cylindrical hole 2, a middle cylindrical hole 3 of greater diameter than the hole 2, and an upper cylindrical hole 4 of greater diameter than the hole 3, thereby providing a shoulder 5. A toolholder 6 has a cylindrical flange portion 7 which sits in the hole 4 resting on the shoulder 5. The holder 6 is held in the magazine 1 by a grub screw, not visible in FIG. 1, engaging against the flange portion 7.

The holder 6 has a cylindrical body portion provided with a central stepped hole comprising a lower cylindrical hole 8 and an upper cylindrical hole 9 of greater diameter than the hole 8 and thereby providing a shoulder 10. The upper hole 9 has two spaced annular grooves or recesses 11, of rectangular cross section, in its cylindrical wall, and each of these recesses houses an O-ring 12 of suitable resilient material, such as hard rubber, which projects from the cylindrical wall of the hole 9.

The device in FIG. 1 is shown holding a cutting tool 13 which is carried by a carrier in the form of a chuck 14 which grips the shank end portion of the tool so that the cutting portion projects from the chuck. The chuck 14 has an attached shank portion 15 of a diameter suitable to be received in a spindle of a machine tool in which the tool 13 is to be used.

The shuck 14 has a cylindrical housing whose diameter is slightly less than that of the hole 9 such that when the chuck is inserted in the hole 9 it is gripped by the rings 12 sufficiently firmly to retain it in the holder 6. The diameter of the chuck housing is greater than that of the cutting portion of the tool 13, and the tool is inserted in the holder with its cutting end leading until the leading end part of the chuck 14 abuts against the shoulder 10.

Figure 2:
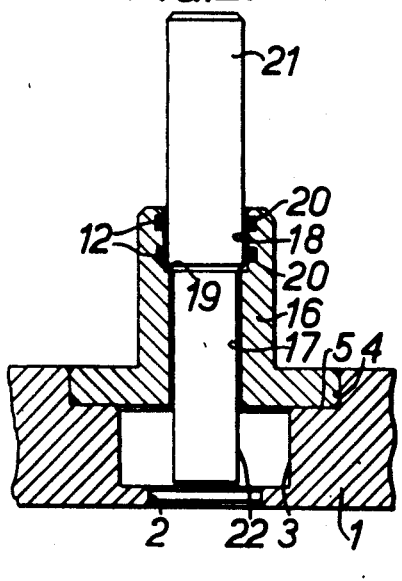

FIG. 2 shows a holder 16 differing in dimensions but essentially similar to the holder 6, and fitted in the same manner in the magazine 1. The holder 16 thus has a central stepped hole comprising a lower cylindrical hole 17 and an upper cylindrical hole 18 of greater diameter and thereby providing a shoulder 19. Two spaced annular recesses 20, of rectangular cross section are provided in the cylindrical wall of the hole 18, each recess housing a resilient ring 12 as previously described with reference to FIG. 1. The device in FIG. 2 is shown holding a cutting tool, such as a slot drill, having an upper shank portion 21 of greater diameter than its cutting portion 22. The hole 18 is of slightly greater diameter than the shank portion 21 so that the tool can be inserted in the holder with the cutting end leading until the leading end of the shank portion 21 abuts against the shoulder 19, the rings 12 then gripping the shank portion 21 to retain the tool in the holder.

Figure 3:
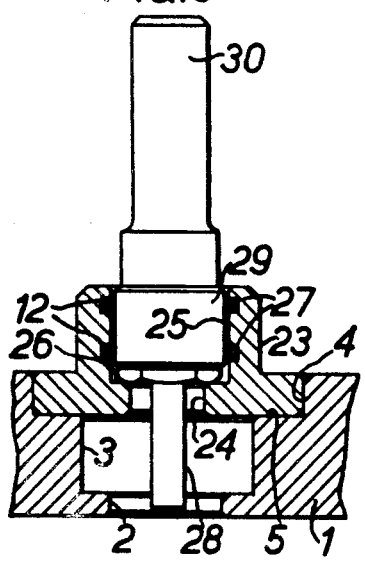

FIG. 3 shows a holder 23 again essentially similar but differing dimensionally from the holder 6 and fitted in the same manner in the magazine 1. The holder 23 thus has a lower cylindrical hole 24 and an upper cylindrical hole 25 of greater diameter and thereby providing a shoulder 26. The hole 25 has two spaced annular recesses 27, of rectangular cross section, in its cylindrical wall, each recess housing a ring 12 as described above. The device in FIG. 3 is shown holding a cutting tool 28 in a carrier in the form of a chuck 29 essentially similar to, but larger than, the tool 13 and chuck 14 shown in FIG. 1. The tool 28 is thus gripped in the chuck 29 by its shank end and is inserted in the holder 23 with its cutting end leading until the leading end part of the chuck abuts against the shoulder 26. The chuck 29 has a cylindrical housing of slightly smaller diameter than the hole 25 so that it is gripped by the rings 12. The chuck has an attached shank portion 30 whose diameter is suitable to be received in a spindle of a machine tool in which the tool 28 is to be used.

Figure 4:
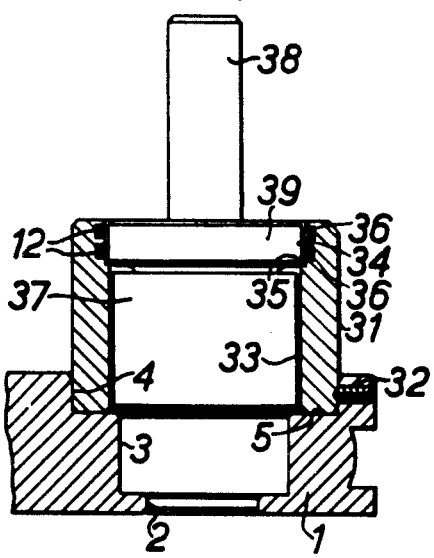

FIG. 4 shows a holder 31 which acts in the same manner as those described above but which does not have a lower flange like the flange 7 since the outside diameter of its cylindrical body is such as to fit in the hole 4 in the magazine 1. FIG. 4 shows a grub screw 32 in a tapped hole in the magazine 1 and by means of which the holder 31 is retained in the magazine, the holders 6, 16 and 23 being similarly held by grub screws acting against their flange portions but not shown in FIGS. 1, 2 and 3.

The holder 31, like the other holders described, has a lower cylindrical hole 33 and an upper cylindrical hole 34 of greater diameter and thereby providing a shoulder 35. The upper hole 34 has two spaced annular recesses 36, of rectangular cross section, in its cylindrical wall, each recess housing a ring 12.

The device in FIG. 4 is shown holding a cutting tool, such as a facing or form cutter, having a cutting portion 37 of greater diameter than its shank portion 38. In this case the tool is fitted with a detachable disc 39 of greater outside diameter than the cutting portion 37 and having a central hole such that the disc can be slid over the shank portion 38. The diameter of the hole 34 is slightly greater than that of the disc 39 so that the disc can be gripped in the hole by the rings 12, the tool being inserted into the holder with its cutting end leading until the disc 39 abuts against the shoulder 35.

Figure 5:
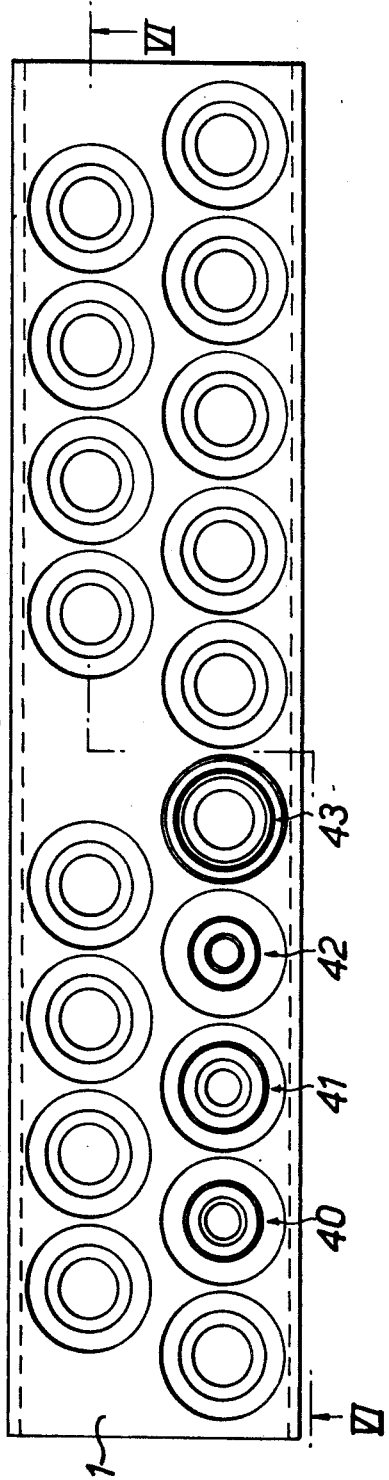
FIG. 5 is a plan view of a first form of tool magazine.
Figure 6:
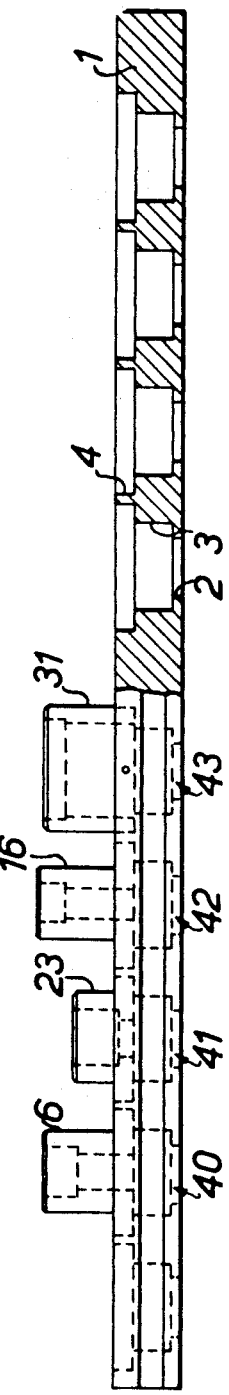
FIG. 6 is a side elevation, partly in section, of the tool magazine shown in FIG. 5 as viewed on the line VI—VI in that figure.

FIGS. 5 and 6 show the complete tool magazine 1 which has a plurality of positions for toolholders, each position having a stepped hole comprising holes 2, 3 and 4 of increasing diameter as described with reference to FIG. 1. In FIGS. 5 and 6 the positions indicated as 40, 41, 42 and 43 are shown occupied by the toolholders illustrated in FIGS. 1, 3, 2 and 4 respectively. The hole 4 has the same diameter at each of the tool-holding positions in the magazine and by providing toolholders with cylindrical base portions, i.e. the flange portions of holders like those shown in FIGS. 1, 2 and 3 or the lower portion of holders like that shown in FIG. 4, all of the same diameter adapted to fit a hole 4, any of such toolholders can be fitted at any of the tool-holding positions in the magazine. Thus, any desired arrangement of tools in the magazine, i.e. the provision of particular tools at particular desired positions, can be achieved by fitting a corresponding arrangement of tool holders so that the holder at each position is appropriate to the tool to be held at that position, and a rearrangement of tools in the magazine can readily be effected by an appropriate rearrangement of tool holders. It will be appreciated from the particular holders shown and described by way of example, that holders can be provided with dimensions suitable for the particular tools it is required should be held in the magazine.

The rings 12 in the holding devices illustrated in FIGS. 1 to 4 inclusive are of circular cross section and are, as previously stated, of resilient material, such as hard rubber, the amount of interference between the ring and the portion of the tool or tool carrier to be gripped thereby being sufficient to firmly retain the tool or carrier in the holder but to permit withdrawal of the tool or carrier therefrom and insertion of the tool or carrier thereinto. The material of the ring can be such that its gripping ability is not unduly affected by temperature changes so that it can receive and grip a tool, or a carrier for a tool which has just been used for machining operations and is therefore comparatively hot.

Alternatively, rings of similar material but of square or rectangular cross section may be used in place of the O-section rings 12. Such a modification is illustrated in FIG. 7 which shows, to a larger scale, a portion of FIG. 4. In FIG. 7, two square section rings 22 are housed in the spaced annular recesses 36. In this modification the detachable disc 39 is replaced with a similar disc 49 which has a greater lead-in as shown at 49A. This lead-in should be sufficient for the leading edge of the disc 49 to have a diameter slightly smaller than the inside diameter of the rings 22. This eliminates any tendency to skew the rings 22 when the disc 49 is entering the rings. The O-section rings 12 in the constructions of FIGS. 1, 2 and 3 could similarly be replaced with square or rectangular section rings.

In FIG. 8 is shown a further modification of FIG. 4 in which rings 52 of D-section replace the rings 12 of O-section. These rings have their inner surface curved, as with an O-ring, but their outer periphery of rectangular cross section. These rings thus are less liable to be skewed than O-rings when the disc 49 is entering between them but allow the disc to be inserted more easily. The lead-in 49A could be omitted with this construction. The O-rings in the constructions of FIGS. 1, 2 and 3 could also be replaced with D-rings.

The tool magazine shown in FIGS. 9 and 10 at 101 has a central row of stepped holes each comprising a lower cylindrical hole 103 and an upper partly cylindrical hole 104 of greater diameter than the hole 103, thereby providing a shoulder 105. On each side of the central row of stepped holes is a row of smaller stepped holes each comprising a lower cylindrical hole 203 and an upper cylindrical hole 204 of larger diameter thereby providing a shoulder 205.

In one of the larger holes is shown a tool holder 106 which is generally cylindrical, having two opposed flats 106A, and sits in the hole 104 resting on the shoulder 105. The holder 106 is retained in the magazine by two setscrews 106B.

The toolholder 106 has a central stepped hole comprising a lower cylindrical hole 108 and an upper cylindrical hole 109 of greater diameter than the hole 108 and thereby providing a shoulder 110. The upper hole 109 has two spaced annular grooves 111 of rectangular cross section in its cylindrical wall and each of these grooves houses an O-ring 112 of suitable material, such as hard rubber, which projects from the cylindrical wall of the hole 109. In place of the O-rings, square section rings such as the rings 22 in FIG. 7, or D-section rings such as the rings 52 in FIG. 8 could be used.

The tool holder 106 carries a cutting tool having a cutting portion 137 of greater diameter than its shank portion and fitted with a detachable disc 139 of greater diameter than the cutting portion 137 and having a central hole so that the disc can be slid over the shank portion 138. The diameter of the hole 109 is slightly greater than the disc 139.

A tool holder may be provided in each of the central row of holes with the flats 106A of adjacent toolholders abutting, the dimensions of the holes 108 and 109 being chosen to be suitable for the tool carried therein.

Smaller tools are carried in similar but smaller toolholders in the outer row of holes. Two such toolholders 206 are shown.

It will be seen that the magazine 101 is deeper than the magazine 1 and is hollow and that the toolholders 106 and 206 are generally shallower than those shown in position in the magazine 1. With the form of magazine 101 the cutting portions of the tools are accommodated within the hollow magazine rather than within the toolholders.

The tool-holding devices described above can advantageously be used in a numerically controlled machine tool as described in the aforementioned specification in which the machine tool spindle, under data control, receives the projecting shank of a tool (or tool carrier) held in the tool magazine, and reinserts the tool, with its cutting end leading, in the magazine after machining, and can also advantageously be used in a computer-controlled machine tool system as described in U.S. application Ser. No. 636,993.

What I claim as my invention and desire to secure by Letters Patent is:

1. A toolholder for holding a cutting tool having a holdable portion of greater diameter than its cutting portion, and a tool magazine for receiving a plurality of toolholders, said toolholder having a cylindrical stepped hole comprising a lower cylindrical portion of diameter less than the holdable portion and greater than the cutting portion to receive the latter, and an upper cylindrical portion of diameter slightly greater than the holdable portion to receive the latter, the wall of the upper cylindrical portion having at least two spaced annular recesses, a ring of resilient material housed in each recess and projecting inwards from the wall to grip the holdable portion, an abutment being formed by the change in diameter between the upper and lower cylindrical portions, against which the holdable portion bears, to limit insertion of the tool into the toolholder, said tool magazine having a plurality of stepped cylindrical holes of the same size having an upper cylindrical portion and a lower cylindrical portion with the change in diameter therebetween forming a step, a plurality of said toolholders inserted each in one of the upper cylindrical portions of the stepped cylindrical holes in the magazine and bearing against the step therein, said toolholders being externally cylindrical and of the same diameter but having different diameter stepped holes therein, and means retaining each toolholder in its hole in the magazine.